United States Patent
Otsu et al.

(10) Patent No.: US 11,450,862 B2
(45) Date of Patent: Sep. 20, 2022

(54) SEPARATOR FOR FUEL CELL AND FUEL CELL

(71) Applicant: TOYOTA JIDOSHA KABUSHIKI KAISHA, Toyota (JP)

(72) Inventors: Wataru Otsu, Susono (JP); Naohiro Hoshikawa, Susono (JP); Masayuki Ito, Shizuoka-ken (JP); Takahiro Kato, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 15/815,875

(22) Filed: Nov. 17, 2017

(65) Prior Publication Data

US 2018/0166702 A1  Jun. 14, 2018

(30) Foreign Application Priority Data

Dec. 9, 2016  (JP) .............................. JP2016-239632

(51) Int. Cl.
 *H01M 8/026* (2016.01)
 *H01M 8/0254* (2016.01)
 *H01M 8/0206* (2016.01)
 *H01M 8/1004* (2016.01)

(52) U.S. Cl.
 CPC ......... *H01M 8/026* (2013.01); *H01M 8/0206* (2013.01); *H01M 8/0254* (2013.01); *H01M 8/1004* (2013.01); *H01M 2250/20* (2013.01); *Y02P 70/50* (2015.11)

(58) Field of Classification Search
 CPC .. H01M 8/026; H01M 8/1004; H01M 8/0258; H01M 8/0265
 See application file for complete search history.

(56) References Cited

U.S. PATENT DOCUMENTS

| 2004/0161656 | A1  | 8/2004 | Sadamoto |
| 2013/0177827 | A1* | 7/2013 | Okabe ................. H01M 8/0258 |
| | | | 429/434 |

FOREIGN PATENT DOCUMENTS

| JP | H08045520 A | 2/1996 |
| JP | 2004-178816 A | 6/2004 |
| JP | 2006004702 A | 1/2006 |
| JP | 2006514405 A | 4/2006 |
| JP | 2007-207730 A | 8/2007 |
| JP | 2007-207731 A | 8/2007 |

(Continued)

OTHER PUBLICATIONS

JP2009081061A Original and Translation from Espacenet (Year: 2009).*

*Primary Examiner* — Nathanael T Zemui
(74) *Attorney, Agent, or Firm* — Hunton Andrews Kurth LLP (57) ABSTRACT

A separator for a fuel cell, includes a separator plate provided with a flow path groove group through which the reaction gas flows. The flow path groove group includes a single first flow path groove, a plurality of second flow path grooves, and a branch portion that connects an end portion of the first flow path groove to end portions of the second flow path grooves. The branch portion includes a narrow portion having a narrower groove width than a groove width of a remaining portion of the branch portion. A groove depth of the narrow portion is shallower than a groove depth of the remaining portion of the branch portion.

11 Claims, 8 Drawing Sheets

(56) References Cited

FOREIGN PATENT DOCUMENTS

| | | |
|---|---|---|
| JP | 2009-059685 A | 3/2009 |
| JP | 2009-081061 A | 4/2009 |
| JP | 2012-119169 A | 6/2012 |
| WO | WO-03081703 A2 * | 10/2003 ............ H01M 8/026 |
| WO | 2004070855 A2 | 8/2004 |
| WO | WO-2004070855 A2 * | 8/2004 .............. H01M 2/00 |
| WO | 2012035584 A1 | 3/2012 |

\* cited by examiner

FIG. 3

PLAN VIEW

SECTIONAL VIEW

FIG. 4

PLAN VIEW

SECTIONAL VIEW

FIG. 5

PLAN VIEW

SECTIONAL VIEW

SEPARATOR FOR FUEL CELL AND FUEL CELL

INCORPORATION BY REFERENCE

The disclosure of Japanese Patent Application No. 2016-239632 filed on Dec. 9, 2016 including the specification, drawings and abstract is incorporated herein by reference in its entirety.

BACKGROUND

1. Technical Field

The disclosure relates to a separator for a fuel cell and a fuel cell.

2. Description of Related Art

Fuel cell vehicles (FCVs) having a fuel cell stack mounted therein have developed as new vehicles different from gasoline vehicles. A fuel cell mounted in the FCV generates power through an electrochemical reaction of a fuel such as hydrogen gas with oxygen in the air, and thus drives a motor.

The fuel cell stack is configured by stacking a plurality of fuel cells. The fuel cell includes a membrane electrode assembly (MEA) in which the electrochemical reaction occurs, and a pair of separator plates with the MEA interposed therebetween. The first separator plate is provided with a flow path groove through which the hydrogen gas flows, and the second separator plate is provided with a flow path groove through which the air flows such that the hydrogen gas and the air are respectively supplied from the flow path grooves to the MEA.

As a form of the flow path groove, for example, a single flow path groove is branched off into a plurality of flow path grooves (for example, refer to Japanese Unexamined Patent Application Publication No. 2009-59685 (JP 2009-59685 A), Japanese Unexamined Patent Application Publication No. 2009-81061 (JP 2009-81061 A), Japanese Unexamined Patent Application Publication No. 2007-207731 (JP 2007-207731 A), Japanese Unexamined Patent Application Publication No. 2007-207730 (JP 2007-207730 A), and Japanese Unexamined Patent Application Publication No. 2004-178816 (JP 2004-178816 A)). In this type of flow path groove, the distance between ribs constituting the flow path groove at the branch portion of the flow path groove is larger than those of portions forward and rearward of the branch portion. Therefore, the separator plate cannot hold the MEA with the ribs at appropriate intervals, and the region of the MEA that is not compressed by the ribs of the separator plate increases.

In the region, the MEA contracts and expands due to repeated drying and wetting, and thus is likely to deform. Therefore, wrinkles, folds, and the like occur in the MEA, and thus the MEA is deteriorated. Accordingly, for example, there is a possibility that cross-leaking may occur (for example, refer to Japanese Unexamined Patent Application Publication No. 2012-119169 (JP 2012-119169 A)).

SUMMARY

Regarding the problem, when the groove width of the entire flow path groove is narrowed, the interval between the ribs can be sufficiently narrowed even at the branch portion, and the region of the MEA that is not compressed can be reduced. However, in this case, in a manufacturing process of the separator plate, for example, relatively high processing accuracy is needed when the flow path groove is formed by press forming or carbon molding. Therefore, it is difficult to maintain the production efficiency. The problem is not limited to the fuel cell stack mounted in the FCV and is also present in fuel cell stacks for other purposes.

The disclosure provides a separator for a fuel cell and a fuel cell capable of maintaining the production efficiency while the deterioration in a membrane electrode assembly is suppressed.

A first aspect relates to a separator for a fuel cell, the separator includes a separator plate provided with a flow path groove group through which a reaction gas for the fuel cell flows. The flow path groove group includes a single first flow path groove, a plurality of second flow path grooves, and a branch portion that connects an end portion of the first flow path groove to end portions of the second flow path grooves. The branch portion includes a narrow portion having a narrower groove width than a groove width of a remaining portion of the branch portion. A groove depth of the narrow portion is shallower than a groove depth of the remaining portion of the branch portion. The remaining portion of the branch portion is a portion of the branch portion, other than the narrow portion.

In the separator according to the first aspect, the narrow portion may be connected to an entrance of each of the second flow path grooves.

In the separator according to the first aspect, angles between a direction in which each of the second flow path grooves extend and a direction in which the single first flow path groove extends may be equal to each other. The groove widths of the narrow portions respectively connected to the entrances of the second flow path grooves may be equal to each other.

In the separator according to the first aspect, each of the second flow path grooves has an angle that is formed between a direction in which the second flow path groove extends and a direction in which the single first flow path groove extends, and the groove width of the narrow portion connected to the entrance of the second flow path groove having the larger angle is wider.

In the separator according to the first aspect, the narrow portion may be connected to an entrance of the single first flow path groove.

In the separator according to the first aspect, the flow path groove group may include a communication groove that provide communication between a third flow path groove adjacent to the single first flow path groove and the narrow portion.

In the separator according to the first aspect, a groove width of the communication groove may be narrower than the groove width of the narrow portion.

In the separator according to the first aspect, a groove depth of the communication groove may be shallower than the groove depth of the narrow portion.

In the separator according to the first aspect, the separator plate may be a metal plate having a corrugated plate shape corresponding to the flow path groove group.

In the separator according to the first aspect, at a point at which the end portion of the first flow path groove and the branch portion are connected to each other, a bottom surface of the first flow path groove and a bottom surface of the branch portion may be connected to each other by an inclined surface.

In the separator according to the first aspect, at a point at which the end portion of the second flow path groove and the branch portion are connected to each other, a bottom surface of the second flow path groove and the bottom surface of the branch portion may be connected to each other by an inclined surface.

A second aspect relates to a fuel cell including: a membrane electrode assembly that generates power using a reaction gas; and a pair of separators between which the membrane electrode assembly is interposed. At least one of the separators is the separator for a fuel cell described above.

According to the aspects, production efficiency can be maintained while the deterioration in the membrane electrode assembly is suppressed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
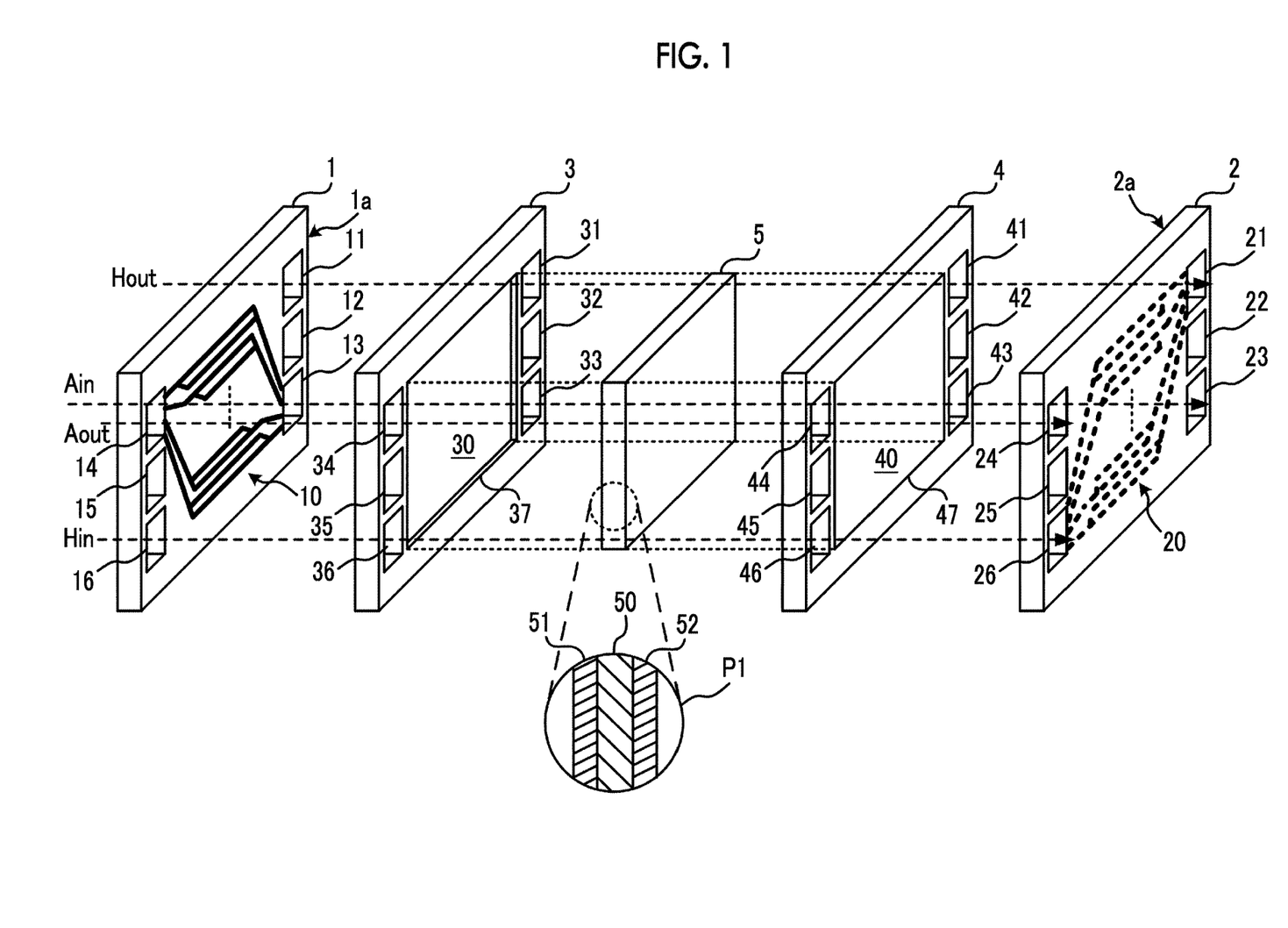
FIG. 1 is an exploded perspective view illustrating an example of a fuel cell.

FIG. 1 is an exploded perspective view illustrating an example of a fuel cell. A fuel cell stack is configured by stacking a plurality of fuel cells, disposing end plates at both ends, and fastening the end plates.

The fuel cell includes a pair of separator plates 1, 2, a pair of support frames 3, 4, a pair of gas diffusion layers 30, 40, and a membrane electrode assembly (MEA) 5, and the gas diffusion layers 30, 40 are respectively accommodated in the support frames 3, 4. The separator plate 1 and the support frame 3 are disposed on the cathode side of the fuel cell, and the separator plate 2 and the support frame 4 are disposed on the anode side of the fuel cell.

The support frames 3, 4 insulate the separator plates 1, 2. By compressing gaskets (not illustrated) provided on the separator plates 1, 2 sides in the support frames 3, 4, the spaces between the support frames 3, 4 and the separator plates 1, 2 are sealed such that airtightness is maintained. Means for sealing the spaces between the support frames 3, 4 and the separator plates 1, 2 is not limited to the gaskets, and for example, the spaces between the support frames 3, 4 and the separator plates 1, 2 may be sealed by joining the support frames 3, 4 to the separator plates 1, 2 with an adhesive (not illustrated). The support frames 3, 4 may be formed by injection molding of a resin member, or may also be formed by attaching a plurality of resin film members.

For example, the support frames 3, 4 are rectangular plate-shaped members, and the support frames 3, 4 have rectangular accommodation holes 37, 47 to accommodate the gas diffusion layers 30, 40 at the center. The MEA 5 is joined to at least one of the support frames 3, 4 and separates the hydrogen gas and air supplied to the MEA 5. Since the MEA 5 is interposed between the gas diffusion layers 30, 40, the gas diffusion layer 30 on the cathode side, the MEA 5, and the gas diffusion layer 40 on the anode side are stacked in this order.

The gas diffusion layers 30, 40 are made of a fiber base material such as carbon fiber, a flow path member formed by processing a metal plate such as so-called expanded metal, or a porous member such as foamed metal. The gas diffusion layer 30 on the cathode side diffuses oxidant gas (air) that is a first reaction gas, and the gas diffusion layer 40 on the anode side diffuses the hydrogen gas that is a second reaction gas.

Reference numeral P1 indicates a cross-section of the MEA 5. The MEA 5 includes an electrolyte membrane 50, a cathode electrode 51, and an anode electrode 52. The electrolyte membrane 50 is made of, for example, an ion-exchange resin membrane that exhibits good proton conductivity in a wet state. Examples of such an ion-exchange resin membrane include a fluororesin membrane having a sulfonic acid group as an ion-exchange group, such as Nafion (registered trademark).

The electrolyte membrane 50 is interposed between the anode electrode 52 and the cathode electrode 51. Each of the anode electrode 52 and the cathode electrode 51 is a catalyst electrode layer, and is formed of catalyst-supporting conductive particles as a porous layer having gas diffusibility. For example, the anode electrode 52 and the cathode electrode 51 are formed as a dried coating film from a catalyst ink which is a solution of dispersed platinum-supporting carbon.

The hydrogen gas is supplied to the anode electrode 52 from the separator plate 2 on the anode side to the gas diffusion layer 40 on the anode side, and the oxidant gas is supplied to the cathode electrode 51 from the separator plate 1 on the cathode side via the gas diffusion layer 30 on the cathode side. The MEA 5 generates power through an electrochemical reaction using the oxidant gas and the hydrogen gas.

For example, the separator plates 1, 2 are formed of a metal plate. In the separator plate 1 on the cathode side, a supply hole 13 and a discharge hole 14 for the oxidant gas (for example, air), a supply hole 16 and a discharge hole 11 for the hydrogen gas, and a supply hole 12 and a discharge hole 15 for a coolant are formed.

Each of the supply holes 12, 13, 16 and the discharge holes 11, 14, 15 is a through-hole extending in a thickness direction of the separator plate 1, and for example, the opening of the hole has a rectangular shape. The supply hole 13 and the discharge hole 14 for the oxidant gas are respectively provided near a pair of opposite angles of the separator plate 1 on the cathode side, and the supply hole 16 and the discharge hole 11 for the hydrogen gas are respectively provided near the other pair of opposite angles of the separator plate 1 on the cathode side. The oxidant gas used for the power generation reaction is supplied to the supply hole 13, and the oxidant gas used for the power generation reaction is discharged to the discharge hole 14.

In the separator plate 1 on the cathode side, a flow path groove group 10 is formed in a surface 1a facing the gas diffusion layer 30 on the cathode side in the support frame 3 on the cathode side, for example, by bending using a press die. More specifically, in the separator plate 1 on the cathode side, ribs constituting the flow path groove group 10 are formed by bending a metal plate using a press die. That is, the separator plate 1 on the cathode side is a metal plate having a corrugated plate shape corresponding to the flow path groove group 10. The separator plate 1 on the cathode side is not limited to metal, and may also be formed by, for example, carbon molding.

The flow path groove group 10 communicates with the supply hole 13 and the discharge hole 14 for the oxidant gas and allows the oxidant gas to flow from the supply hole 13 to the discharge hole 14. At this time, the oxidant gas is supplied to the MEA 5 through the gas diffusion layer 30 on the cathode side to be used for power generation, and then returns to the flow path groove group 10 through the gas diffusion layer 30 on the cathode side.

The hydrogen gas used for the power generation reaction is supplied to the supply hole 16, and the hydrogen gas used for the power generation reaction is discharged to the discharge hole 11. The coolant that cools the fuel cell is supplied to the supply hole 12, and the coolant is discharged to the discharge hole 15.

The support frames 3, 4 and the separator plate 2 on the anode side are provided with through-holes that overlap the supply hole 13 and the discharge hole 14 during stacking. More specifically, the support frames 3, 4 are provided with supply holes 33, 43 to which the oxidant gas is supplied and discharge holes 34, 44 to which the oxidant gas is discharged. The separator plate 2 on the anode side is provided with a supply hole 23 to which the oxidant gas is supplied and a discharge hole 24 to which the oxidant gas is discharged.

The supply holes 13, 33, 43, 23 overlap and constitute an oxidant gas supply manifold. The oxidant gas flows in a stacking direction of the fuel cell stack in the oxidant gas supply manifold as indicated by the arrow Ain.

The discharge holes 14, 34, 44, 24 overlap and constitute an oxidant gas discharge manifold. The oxidant gas flows in the stacking direction of the fuel cell stack in the oxidant gas discharge manifold as indicated by the arrow Aout.

In addition, in the separator plate 2 on the anode side, a supply hole 26 and a discharge hole 21 for the hydrogen gas and a supply hole 22 and a discharge hole 25 for the coolant are further formed.

Each of the supply holes 22, 23, 26 and the discharge holes 21, 24, 25 is a through-hole extending in a thickness direction of the separator plate 2, and for example, the opening of the hole has a rectangular shape. The supply hole 23 and the discharge hole 24 for the oxidant gas are respectively provided near a pair of opposite angles of the separator plate 2 on the anode side, and the supply hole 26 and the discharge hole 21 for the hydrogen gas are respectively provided near the other pair of opposite angles of the separator plate 2 on the anode side. The hydrogen gas used for the power generation reaction is supplied to the supply hole 26, and the hydrogen gas used for the power generation reaction is discharged to the discharge hole 21.

In the separator plate 2 on the anode side, a flow path groove group 20 is formed in a surface 2a facing the gas diffusion layer 40 on the anode side in the support frame 4 on the anode side, for example, by bending using a press die. More specifically, in the separator plate 2 on the anode side, ribs constituting the flow path groove group 20 are formed by bending a metal plate using a press die. That is, the separator plate 2 on the anode side is a metal plate having a corrugated plate shape corresponding to the flow path groove group 20. The separator plate 2 on the anode side is not limited to metal, and may also be formed by, for example, carbon molding.

The flow path groove group 20 communicates with the supply hole 26 and the discharge hole 21 for the hydrogen gas and allows the hydrogen gas to flow from the supply hole 26 to the discharge hole 21. At this time, the hydrogen gas is supplied to the MEA 5 through the gas diffusion layer 40 on the anode side to be used for power generation, and then returns to the flow path groove group 20 through the gas diffusion layer 40 on the anode side.

The support frames 3, 4 are provided with through-holes that overlap the supply hole 26 and the discharge hole 21 during stacking. More specifically, the support frames 3, 4 are provided with supply holes 36, 46 to which the hydrogen gas is supplied and discharge holes 31, 41 to which the hydrogen gas is discharged.

The supply holes 16, 36, 46, 26 overlap and constitute a hydrogen gas supply manifold. The hydrogen gas flows in the stacking direction of the fuel cell stack in the hydrogen gas supply manifold as indicated by the arrow Hin.

The discharge holes 11, 31, 41, 21 overlap and constitute a hydrogen gas discharge manifold. The hydrogen gas flows in the stacking direction of the fuel cell stack in the hydrogen gas discharge manifold as indicated by the arrow Hout.

The supply holes 12, 32, 42, 22 for the coolant overlap and constitute a coolant supply manifold, and the discharge holes 15, 35, 45, 25 for the coolant overlap and constitute a coolant discharge manifold. The coolant flows in the stacking direction of the fuel cell stack in the coolant supply manifold and the hydrogen gas supply manifold. Although not illustrated, the coolant flows through at least one of flow path grooves formed in the surface opposite to the surface 1a of the separator plate 1 on the cathode side and flow path grooves formed in the surface opposite to the surface 2a of the separator plate 2 on the anode side to cool the fuel cell.

As described above, the MEA 5 that generates power using the oxidant gas and the hydrogen gas is interposed between the separator plates 1, 2. The surfaces 1a, 2a of the separator plates 1, 2 facing the MEA 5 are respectively provided with the flow path groove groups 10, 20 through which the oxidant gas and the hydrogen gas delivered to and from the MEA 5 flow. In this example, the fuel cell is provided with the gas diffusion layers 30, 40, but may also be provided with other porous layers instead of the gas diffusion layers 30, 40.

Figure 2:
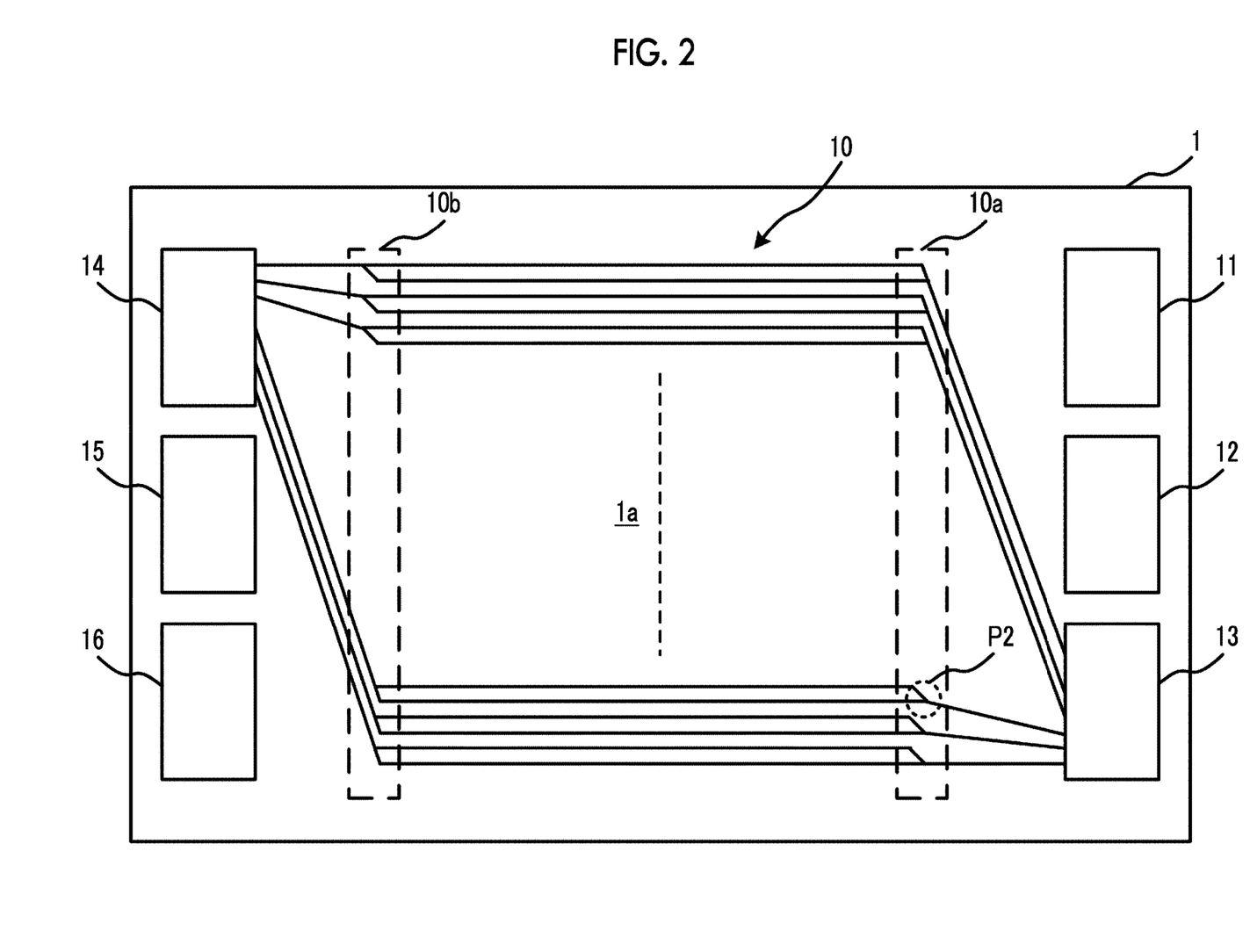
FIG. 2 is a plan view showing an example of a separator plate.

FIG. 2 is a plan view showing an example of the separator plate 1 on the cathode side. In this example, the separator plate 1 on the cathode side is cited, but the configuration described below can be similarly applied to the separator plate 2 on the anode side.

In the surface 1a of the separator plate 1 on the cathode side, the flow path groove group 10 through which the oxidant gas flows is formed. The flow path groove group 10 communicates with the supply hole 13 and the discharge hole 14 for the oxidant gas. The flow path groove group 10 is provided with branch portions 10a, 10b at which a single first flow path groove is branched off into a plurality of second flow path grooves.

At the branch portion 10a, each groove communicating with the supply hole 13 is branched off into a plurality of second flow path grooves, and at the branch portion 10b, each groove communicating with the discharge hole 14 is branched off into a plurality of second flow path grooves. Therefore, the separator plate 1 on the cathode side can efficiently supply the oxidant gas to the MEA 5 by increasing the number of flow path grooves overlapping the gas diffusion layer 30 on the cathode side. In addition, in the case of the separator plate 2 on the anode side, the hydrogen gas can be efficiently supplied to the MEA 5 by increasing the number of flow path grooves. In the following examples, the configuration of a portion of the branch portion 10a denoted by reference numeral P2 is described, but the same configuration can be applied to the other portions of the branch portions 10a, 10b.

Comparative Example

Figure 3:
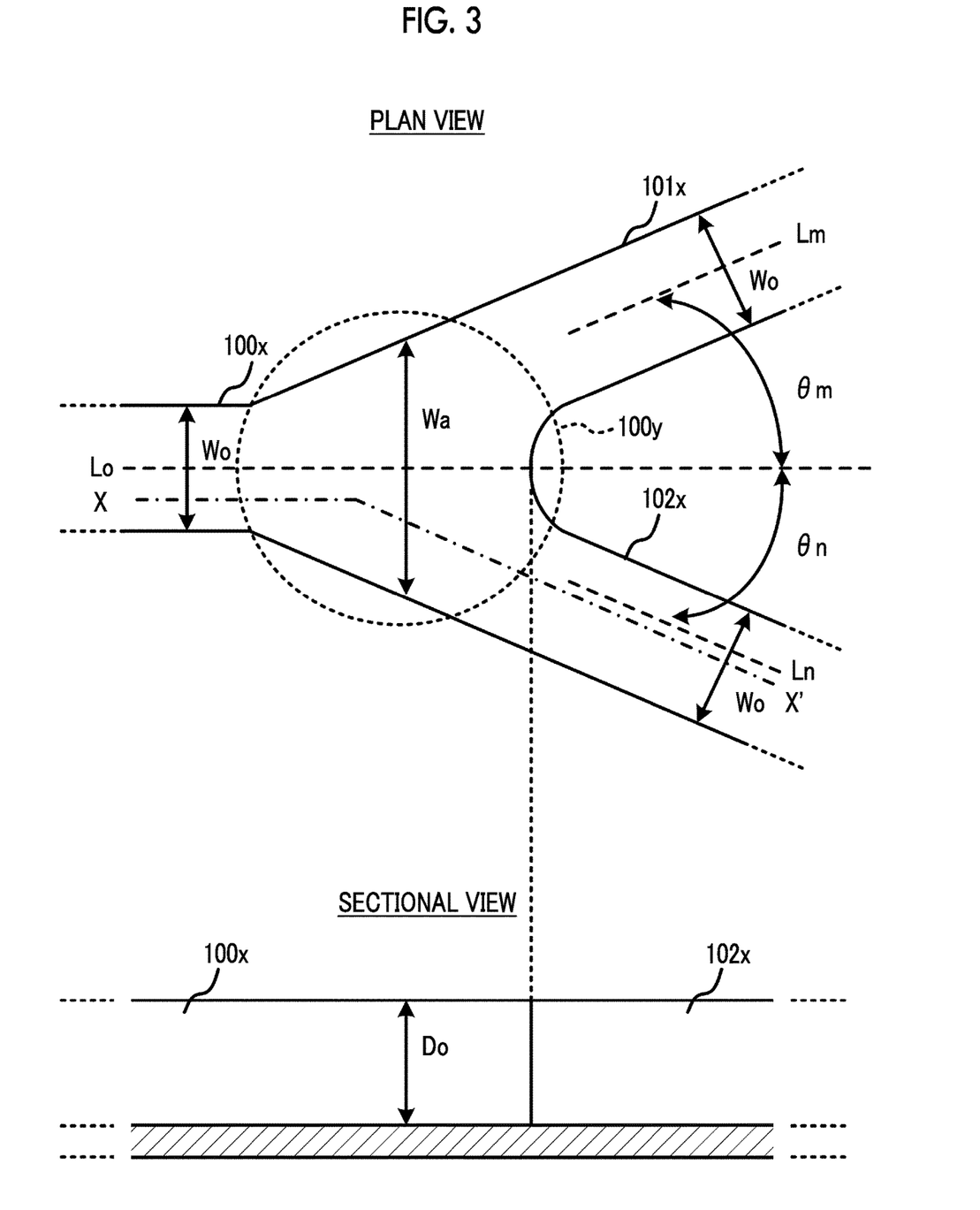
FIG. 3 is a plan view and a sectional view illustrating a branch portion of a comparative example.

FIG. 3 is a plan view and a sectional view illustrating the branch portion 10a of a comparative example. At the branch portion 10a, a single first flow path groove 100x is branched off into two second flow path grooves 101x, 102x. Angles θm, θn between directions Lm, Ln in which the second flow path grooves 101x, 102x as branch destinations extend and a direction Lo in which the first flow path groove 100x as a branch source extends are equal to each other. In FIG. 3, the section is taken along the line segment X-X' along the flow path grooves 100x, 102x.

A groove depth Do and a groove width Wo of the flow path grooves 100x to 102x are constant before and after the branching. However, a groove width Wa of an intersection 100y of the flow path grooves 100x to 102x increases from the first flow path groove 100x as the branch source toward each of the second flow path grooves 101x, 102x as the branch destinations.

Therefore, at the branch portion 10a, the distance between the ribs constituting the flow path grooves 100x to 102x is larger than those of the portions before and after the branching. Accordingly, the separator plate 1 on the cathode side cannot hold the MEA 5 with the ribs at appropriate intervals, and the region of the MEA that is not compressed by the ribs of the separator plate 1 on the cathode side increases.

In the region, the MEA 5 contracts and expands due to repeated drying and wetting, and thus is likely to deform. Therefore, wrinkles, folds, and the like occur in the MEA 5, and thus the MEA is deteriorated. Accordingly, for example, there is a possibility that cross-leaking may occur.

Regarding this, when the groove width of the entire flow path groove group 10 is narrowed, the interval between the ribs can be sufficiently narrowed even at the branch portions 10a, 10b, and the region of the MEA 5 that is not compressed can be reduced. However, in this case, in a manufacturing process of the separator plate 1 on the cathode side, for example, relatively high processing accuracy is needed when the flow path grooves are formed by press forming or carbon molding. Therefore, it is difficult to maintain production efficiency.

Here, the separator plates 1, 2 of examples are provided with a narrow portion having a narrower groove width than the remaining portion in the branch portions 10a, 10b, and the narrow portion is configured to have a shallower groove depth than the remaining portion. With the configuration, the distance between the ribs can be reduced by providing the narrow portion in the separator plates 1, 2 at the branch portions 10a, 10b, and thus the MEA 5 can be held by the ribs at appropriate intervals.

Furthermore, in the separator plates 1, 2, since the groove depth of the narrow portion is shallower than those of the remaining portion, the separator plates 1, 2 can be easily produced by press forming, carbon molding, or the like, and thus production efficiency can be maintained. For example, in a case where the separator plates 1, 2 are produced by press forming, since the groove depth of the narrow portion is shallow even though the groove width thereof is narrow, an increase in the amount of a material elongated by the pressing can be suppressed. As a result, an increase in the number of processing processes is suppressed, and production is facilitated. In addition, in a case where the separator plates 1, 2 are produced by carbon molding, since the groove depth of the narrow portion is shallow even though the groove width thereof is narrow, the mold can be easily manufactured, and the service life of the mold can also be increased. Accordingly, it is possible to maintain the production efficiency of the separator plates 1, 2.

First Embodiment

Figure 4:
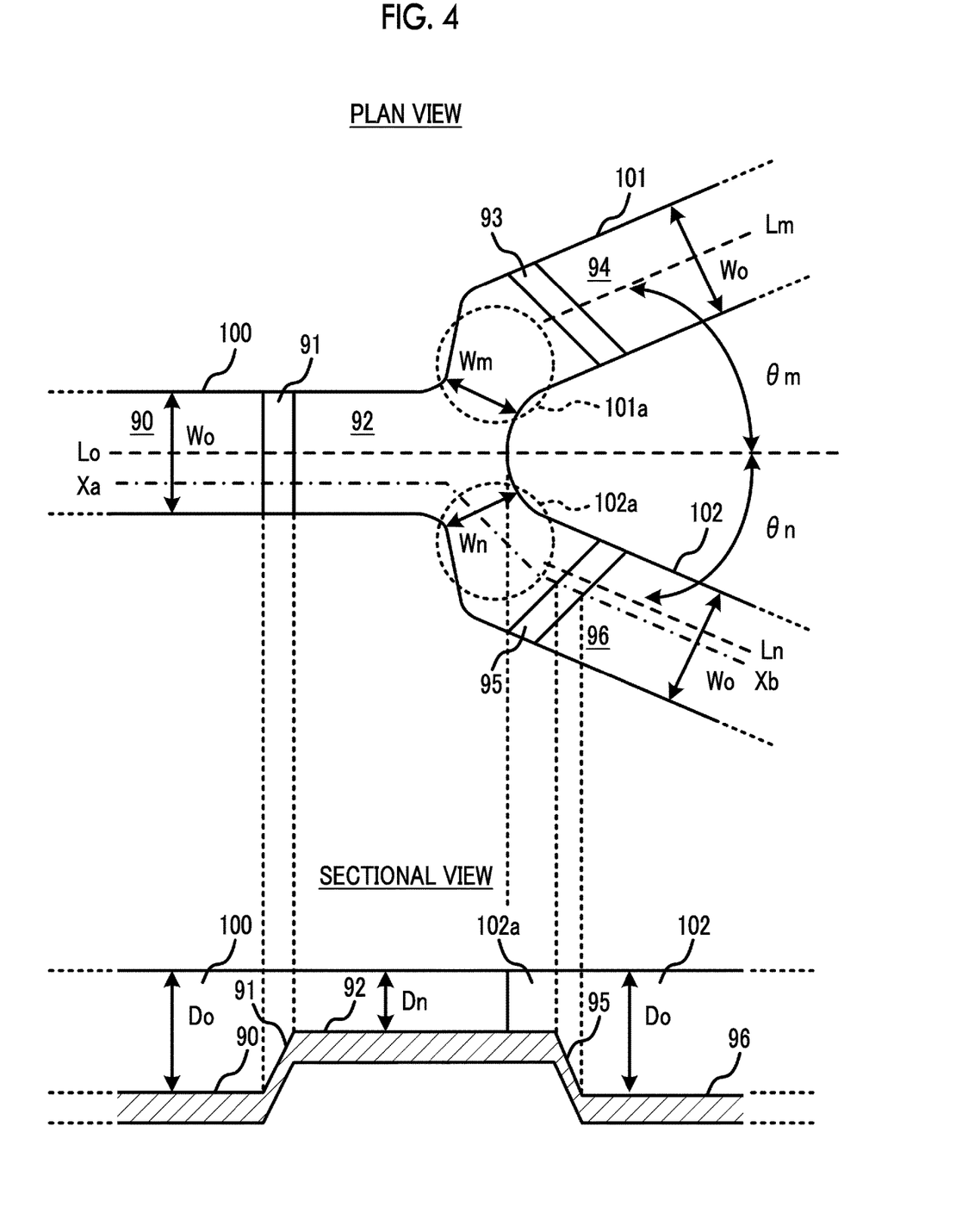
FIG. 4 is a plan view and a sectional view illustrating a branch portion of a first embodiment.

FIG. 4 is a plan view and a sectional view illustrating the branch portion 10a of a first embodiment. At the branch portion 10a, a single first flow path groove 100 is branched off into two second flow path grooves 101, 102. The angles θm, θn between the directions Lm, Ln in which the second flow path grooves 101, 102 as branch destinations extend and the direction Lo in which the first flow path groove 100 as a branch source extends are equal to each other. In FIG. 4, the section is taken along the line segment Xa-Xb along the flow path grooves 100, 102.

A narrow portion 101a is provided at the entrance of the second flow path groove 101 as the branch destination, and a narrow portion 102a is provided at the entrance of the second flow path groove 102 as the branch destination. A groove width Wm of the narrow portion 101a and a groove width Wn of the narrow portion 102a are narrower than the groove width Wo of the other portions. The entrance of second flow path groove 101 as the branch destination indicates a portion of the second flow path groove 101 that is closest to the first flow path groove 100 as the branch source.

Therefore, in the separator plate 1 on the cathode side, the distance between the ribs at the branch portion 10a can be reduced, and thus the MEA 5 can be held with the ribs at appropriate intervals.

More specifically, the groove width Wm of the narrow portion 101a gradually widens from the first flow path groove 100 as the branch source toward the second flow path groove 101 as the branch destination, and the groove width Wn of the narrow portion 102a gradually widens from the first flow path groove 100 as the branch source toward the second flow path groove 102 as the branch destination. In FIG. 4, the minimum groove widths Wm, Wn of the narrow portions 101a, 102a are indicated by arrows.

The groove width Wm of the narrow portion 101a and the groove width Wn of the narrow portion 102a may be different from each other, and may be the same. This is because the angles θm, θn of the second flow path grooves 101, 102 as the branch destinations are equal to each other, and thus the oxidant gas flowing from the first flow path groove 100 as the branch source can be allowed to flow into the second flow path grooves 101, 102 at substantially the same flow rate.

Furthermore, the groove depths of the narrow portions 101a, 102a are shallower than those of the other portions. More specifically, among bottom surfaces 90 to 96 of the flow path grooves 100 to 102, a bottom surface 92 of the narrow portions 101a, 102a, that is, the entrances of the second flow path grooves 101, 102 as the branch destinations is higher than the other bottom surfaces 90, 91, 93, 94, 95, 96.

As illustrated in the section, the groove depth Do of the bottom surface 90 of the first flow path groove 100 as the branch source and the bottom surface 96 of the second flow path groove 101 as the branch destination is deeper than a groove depth Dn of the intersection of the three flow path grooves 100 to 102 including the narrow portions 101a, 102a. In addition, the bottom surface 91 of the first flow path groove 100 as the branch source is formed as an inclined surface for connection between the bottom surface 90 and the bottom surface 92, and the groove depth of the bottom surface 91 becomes shallower from the bottom surface 90 toward the bottom surface 92. The bottom surface 95 of the second flow path groove 102 as the branch destination is formed as an inclined surface for connection between the bottom surface 96 and the bottom surface 92, and the groove depth of the bottom surface 95 becomes shallower from the bottom surface 96 toward the bottom surface 92.

Although not illustrated in a section, the groove depth Do of the bottom surface 94 of the second flow path groove 101 as the branch destination is deeper than the groove depth Dn of the intersection of the three flow path grooves 100 to 102 including the narrow portions 101a, 102a. The bottom surface 93 of the second flow path groove 101 as the branch destination is formed as an inclined surface for connection between the bottom surface 94 and the bottom surface 92, and the groove depth of the bottom surface 93 becomes shallower from the bottom surface 94 toward the bottom surface 92.

In the separator plate 1 on the cathode side, since the groove depth Dn of the narrow portions 101a, 102a is shallower than those of the remaining portion, as described above, the separator plate 1 on the cathode side can be easily produced by press forming, carbon molding, or the like, and thus production efficiency can be maintained. Furthermore, since the separator plate 1 on the cathode side is a metal plate having a corrugated plate shape corresponding to the flow path groove group 10, the production efficiency is particularly effectively maintained.

In this example, since the narrow portions 101a, 102a are solely provided at the entrances of the second flow path grooves 101, 102 as the branch destinations among the three flow path grooves 100 to 102, an increase in the pressure loss in the first flow path groove 100 as the branch source at which the flow rate of the oxidant gas is high is suppressed. However, as in the following examples, a narrow portion 100a may also be provided at the entrance of the first flow path groove 100 as the branch source.

Second Embodiment

Figure 5:
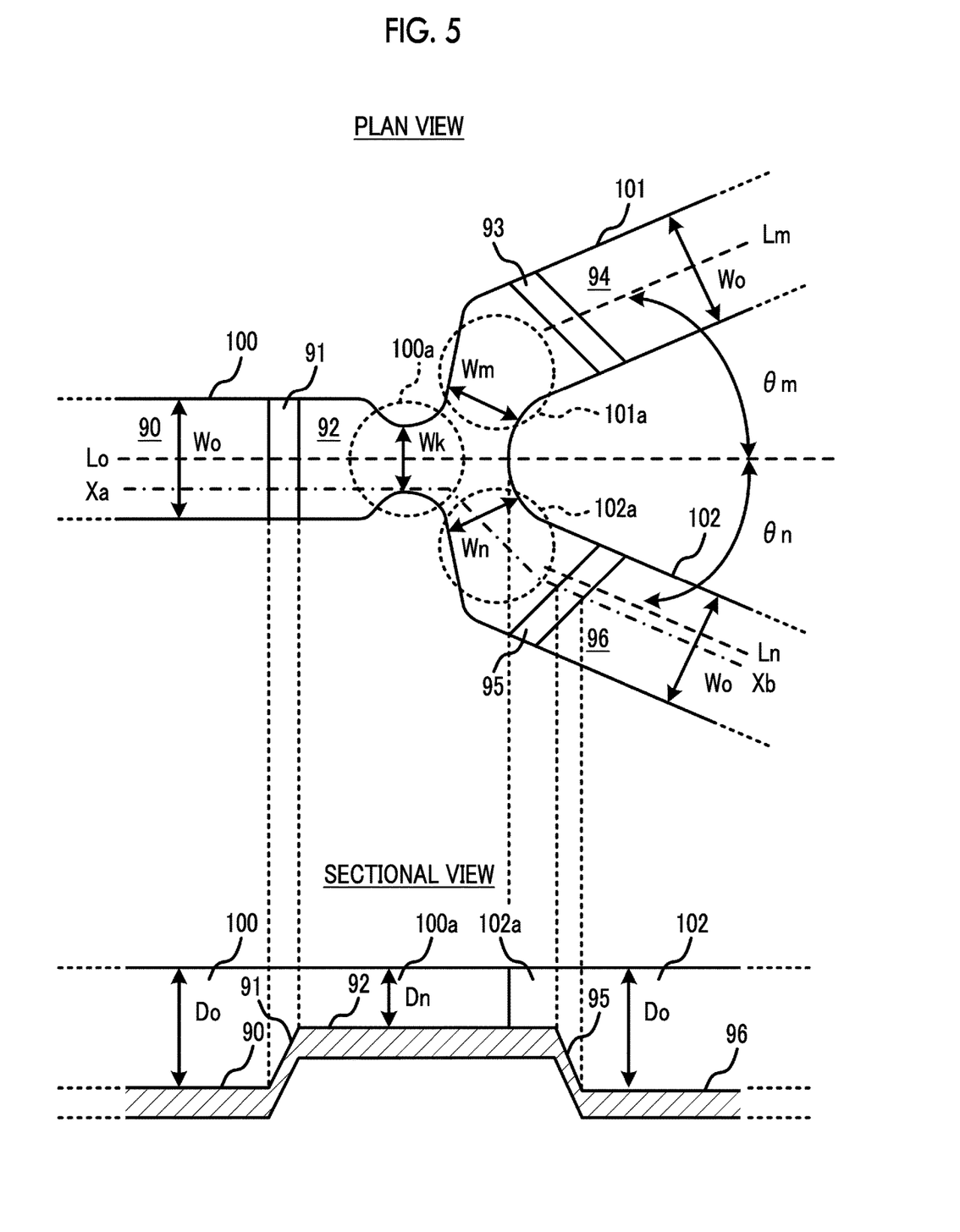
FIG. 5 is a plan view and a sectional view illustrating a branch portion of a second embodiment.

FIG. 5 is a plan view illustrating the branch portion 10a of a second embodiment. In FIG. 5, like configurations common to those in FIG. 4 are denoted by like reference numerals, and the description thereof will be omitted. In FIG. 5, the section is taken along the line segment Xa-Xb along the flow path grooves 100, 102.

The narrow portion 101a is provided at the entrance of the second flow path groove 101 as the branch destination, and the narrow portion 102a is provided at the entrance of the second flow path groove 102 as the branch destination. The narrow portion 100a is also provided at the entrance of the first flow path groove 100 as the branch source. The groove width Wm of the narrow portion 101a, and the groove width Wn of the narrow portion 102a, and a groove width Wk of the narrow portion 100a are narrower than the groove width Wo of the remaining portion. The entrance of the first flow path groove 100 as the branch source indicates a portion of the first flow path groove 100 that is closest to the second flow path groove 101, 102 as the branch destinations.

Therefore, in the separator plate 1 on the cathode side, the distance between the ribs at the branch portion 10a can be further reduced than in the first embodiment, and thus the MEA 5 can be held with the ribs at appropriate intervals.

Furthermore, the groove depths of the narrow portions 101a, 102a are shallower than the remaining portion. More specifically, among the bottom surfaces 90 to 96 of the flow path grooves 100 to 102, the bottom surface 92 of the narrow portions 100a to 102a, that is, the entrances of the flow path grooves 100 to 102, is higher than the other bottom surfaces 90, 91, 93, 94, 95, 96.

In the separator plate 1 on the cathode side, since the groove depth Dn of the narrow portions 100a to 102a is shallower than the remaining portion, as described above, the separator plate 1 on the cathode side can be easily produced by press forming, carbon molding, or the like, and thus the production efficiency can be maintained.

Furthermore, in the case where the narrow portions 100a to 102a are provided, the side walls of the flow path grooves 100 to 102 at the narrow portions 100a to 102a protrude toward the inside of the flow path grooves, and thus the distance between the other flow path grooves adjacent to the first flow path groove 100 and the flow path grooves 100 to 102 is larger than those in the other portions. Therefore, there is a possibility that the supply of the oxidant gas is insufficient in a region between the other adjacent flow path grooves and the narrow portions 100a to 102a. Therefore, as in the following example, a fine flow path groove through which the oxidant gas flows into the region may be provided.

Third Embodiment

Figure 6:
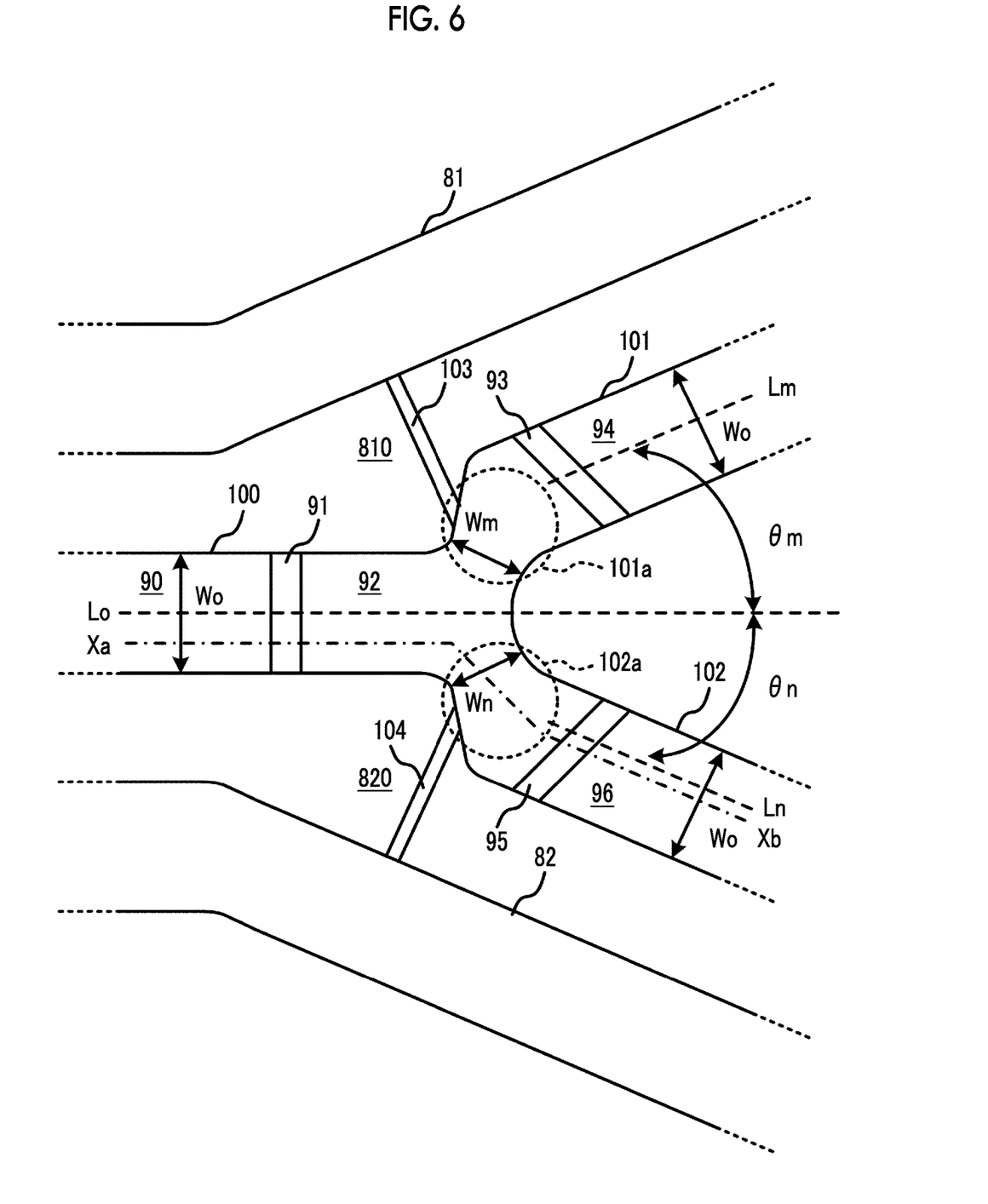
FIG. 6 is a plan view illustrating a branch portion of a third embodiment.

FIG. 6 is a plan view illustrating the branch portion 10a of a third embodiment. In FIG. 6, like configurations common to those in FIG. 4 are denoted by like reference numerals, and the description thereof will be omitted. In this example, the configuration of the first embodiment is adopted as a base, but the configuration described below can also be applied to the configuration of the second embodiment.

Two third flow path grooves 81, 82 are adjacent to the first flow path groove 100, the third flow path groove 81 is formed along the flow path grooves 100, 101, and the third flow path groove 82 is formed along the flow path grooves 100, 102. At the narrow portion 101a, the side wall of the second flow path groove 101 protrudes toward the inside of the flow path groove, and the distance between the third flow path groove 81 and the narrow portion 101a is longer than those of the other portions. In addition, at the narrow portion 102a, the side wall of the second flow path groove 102 protrudes toward the inside of the flow path groove, and the distance between the third flow path groove 82 and the narrow portion 102a is longer than those of the other portions.

Therefore, a fine flow path groove 103 through which the oxidant gas flows between the third flow path groove 81 and the narrow portion 101a is provided in a region 810 between the third flow path groove 81 and the narrow portion 101a, and a fine flow path groove 104 through which the oxidant gas flows between the third flow path groove 82 and the narrow portion 102a is provided in a region 820 between the third flow path groove 82 and the narrow portion 102a. That is, the flow path groove group 10 includes the fine flow path groove 103 which is a communication groove that allows the third flow path groove 81 and the narrow portion 101a to communicate with each other, and the fine flow path groove 104 which is a communication groove that allows the third flow path groove 82 and the narrow portion 102a to communicate with each other.

Therefore, insufficient supply of the oxidant gas to the region 810 between the third flow path groove 81 and narrow portion 101a and the region 820 between the third flow path groove 82 and narrow portion 102a is suppressed.

In addition, the groove width of the fine flow path grooves 103, 104 is narrower than the groove width of the narrow portions 101a, 102a. Therefore, in the separator plate 1 on the cathode side, the distance between the ribs at the branch portion 10a can be reduced to the same extent as in the first embodiment, and thus the MEA 5 can be held with the ribs at appropriate intervals.

Furthermore, the groove depth of the fine flow path grooves 103, 104 is shallower than the groove depth of the narrow portions 101a, 102a. Therefore, the separator plate 1 on the cathode side can be easily produced by press forming, carbon molding, or the like, and thus the production efficiency can be maintained.

In each of the embodiments described above, the angles θm, θn between the directions Lm, Ln in which the second flow path grooves 101, 102 as the branch destinations extend and the direction Lo in which the first flow path groove 100 as the branch source extends are equal to each other. However, the angles θm, θn are not limited thereto and may be different from each other. In this case, the flowability of the oxidant gas flowing to the second flow path grooves 101, 102 differs according to the angles θm, θn. Therefore, as in the following example, the flow rate of the oxidant gas flowing to the second flow path grooves 101, 102 may be caused to be uniform by causing the groove widths of the narrow portions 101a, 102a of the second flow path grooves 101, 102 to differ according to the angles θm, θn.

Fourth Embodiment

Figure 7:
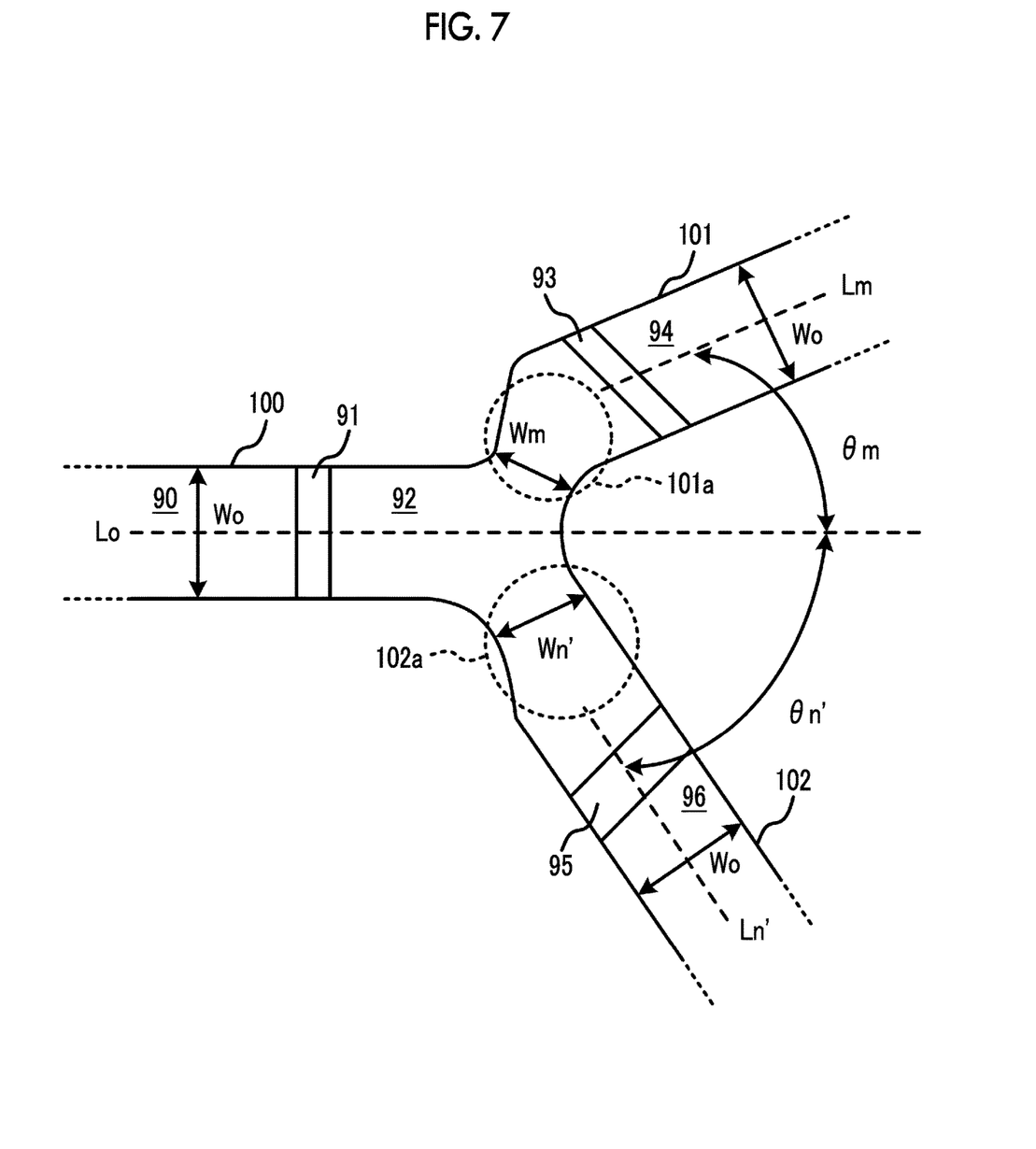
FIG. 7 is a plan view illustrating a branch portion of a fourth embodiment.

FIG. 7 is a plan view illustrating the branch portion 10a of a fourth embodiment. In FIG. 7, like configurations common to those in FIG. 4 are denoted by like reference numerals, and the description thereof will be omitted. In this example, the configuration of the first embodiment is adopted as a base, but the configuration described below can also be applied to the configuration of the second embodiment.

In this example, angles θm, θn' between directions Lm, Ln' in which the second flow path grooves 101, 102 as the branch destinations extend and the direction Lo in which the first flow path groove 100 as the branch source extends are different from each other. The angle θm of the second flow path groove 101 is smaller than the angle θn' of the second flow path groove 102. That is, the degree of bending of the second flow path groove 102 with respect to the first flow path groove 100 as the branch source is larger than that of the second flow path groove 101.

The oxidant gas flowing from the first flow path groove 100 as the branch source flows more easily to the second flow path groove 101 having the smaller angle θm than to the second flow path groove 102 having the larger angle θn'. Therefore, groove widths Wm, Wn' of the narrow portions 101a, 102a of the second flow path grooves 101, 102 differ according to the angles θm, θn' so that there is no difference in the flow rate of the oxidant gas between the second flow path groove 102 having the larger angle θn' and the second flow path groove 101 having the smaller angle θm.

More specifically, the groove width Wm of the narrow portion 101a of the second flow path groove 101 having the smaller angle θm is narrower than the groove width Wn' of the second flow path groove 102 having the larger angle θn'. That is, the groove widths Wm, Wn' of the narrow portions 101a, 102a are set such that the groove width is wider at larger one of the angles θm, θn' between the directions Lm, Ln' in which the second flow path grooves 101, 102 as the branch destinations extend and the direction Lo in which the first flow path groove 100 as the branch source extends. Therefore, the flow rate of the oxidant gas flowing to the second flow path grooves 101, 102 is adjusted to be uniform by the groove widths Wm, Wn' of the narrow portions 101a, 102a.

Therefore, by causing the flow rate of the oxidant gas flowing to the second flow path grooves 101, 102 to be uniform, the amount of power generated by the entire MEA 5 can be uniformly distributed. Even in this embodiment, the fine flow path grooves 103, 104 described above may also be provided.

In each of the embodiments described above, the number of second flow path grooves 101, 102 as the branch destinations is two, but the number thereof is not limited thereto. As in the following example, a flow path groove group 19 may include the branch portion 10a in which a single flow path groove is branched off into three flow path grooves.

Fifth Embodiment

Figure 8:
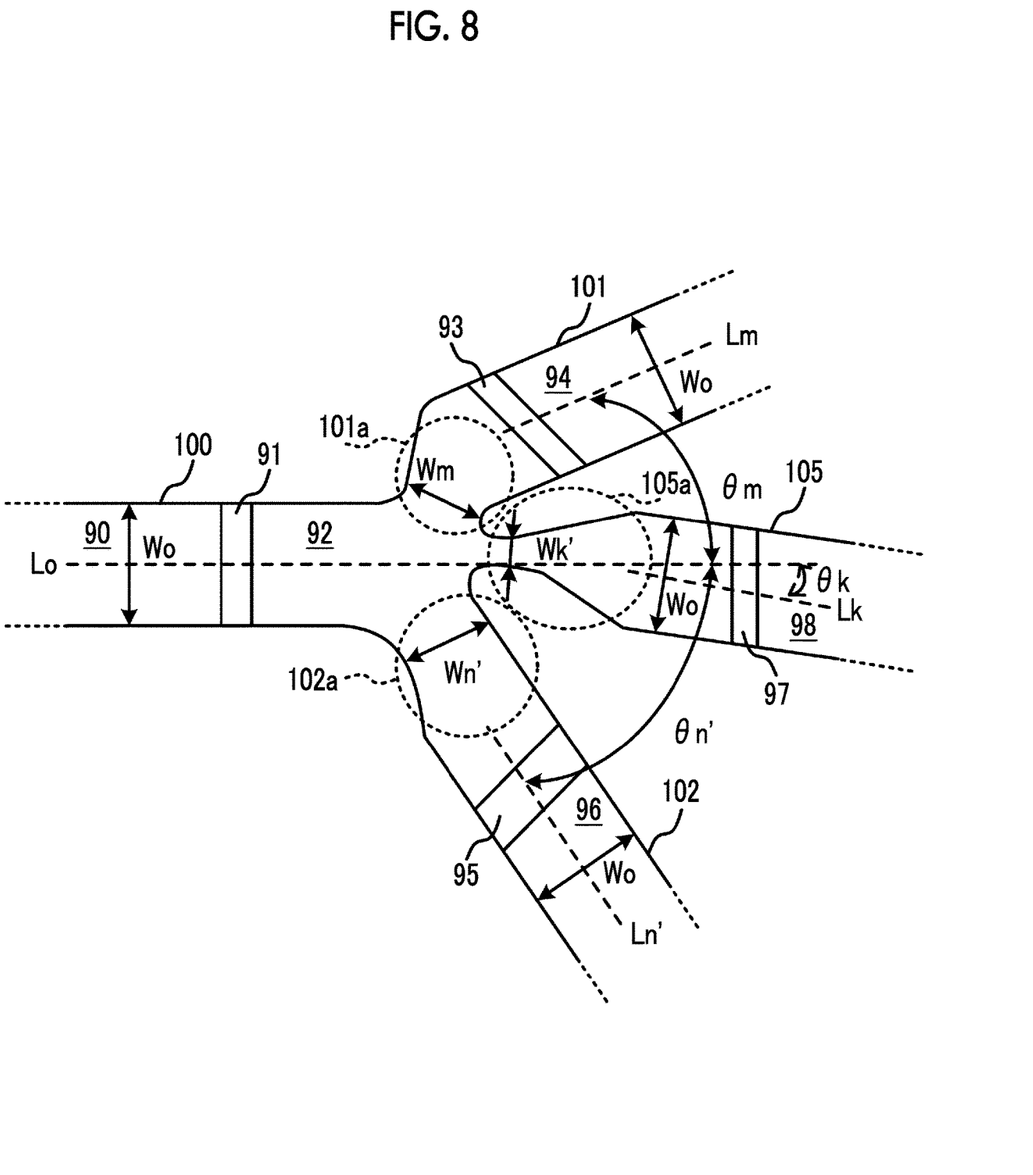
FIG. 8 is a plan view illustrating a branch portion of a fifth embodiment.

FIG. 8 is a plan view illustrating the branch portion 10a of a fifth embodiment. In FIG. 8, like configurations common to those in FIG. 7 are denoted by like reference numerals, and the description thereof will be omitted. In this example, the configuration of the fourth embodiment is adopted as a base, but the configuration described below can also be applied to the configurations of the second and third embodiments.

At the branch portion 10a, the single first flow path groove 100 is branched off into three second flow path grooves 101, 102, 105. The second flow path groove 105 as a branch destination extends between the second flow path grooves 101, 102 as the other branch destinations.

A narrow portion 105a is provided at the entrance of the second flow path groove 105 as the branch destination. A groove width Wk' of the narrow portion 105a is narrower than the groove width Wo of the other portions. More specifically, the groove width Wk' of the narrow portion 105a gradually widens from the first flow path groove 100 as the branch source toward the second flow path groove 105 as the branch destination. In FIG. 8, the minimum groove width Wk' of the narrow portion 105a is indicated by the arrow.

Furthermore, the groove depths of the narrow portions 101a, 102a, 105a are shallower than those of the other portions. More specifically, among bottom surfaces 90 to 98 of the flow path grooves 100 to 105, the bottom surface 92 of the narrow portions 101a, 102a, 105a, that is, the entrances of the second flow path grooves 101, 102, 105 as the branch destinations is higher than the other bottom surfaces 90, 91, 93, 94, 95, 96, 97, 98.

The groove depth Do of the bottom surface 90 of the first flow path groove 100 as the branch source and the bottom surface 98 of the second flow path groove 105 as the branch destination is deeper than the groove depth Dn of the intersection of the four flow path grooves 100 to 102, 105 including the narrow portions 101a, 102a, 105a. The bottom surface 97 of the second flow path groove 105 as the branch destination is formed as an inclined surface for connection between the bottom surface 98 and the bottom surface 92, and the groove depth of the bottom surface 97 becomes shallower from the bottom surface 98 toward the bottom surface 92.

Angles θm, θn', θk between directions Lm, Ln', Lk in which the second flow path grooves 101, 102, 105 as the branch destinations extend and the direction Lo in which the first flow path groove 100 as the branch source extends are different from each other. The angle θk of the second flow path groove 105 is smaller than the angles θm, θn' of the other second flow path grooves 101, 102. That is, the degree of bending of the second flow path groove 105 with respect to the first flow path groove 100 as the branch source is smallest.

Therefore, The oxidant gas flowing from the first flow path groove 100 as the branch source flows more easily to the second flow path groove 105 having the smallest angle θk. Therefore, the groove widths Wm, Wn', Wk' of the narrow portions 101a, 102a, 105a of the second flow path grooves 101, 102, 105 differ according to the angles θm, θn', θk so that there is no difference in the flow rate of the oxidant gas between the second flow path groove 102 having the largest angle θn', the second flow path groove 101 having the second largest angle θm, and the second flow path groove 105 having the smallest angle θk.

More specifically, the groove width Wk' of the narrow portion 105a of the second flow path groove 105 having the smallest angle θk is smaller than the groove widths Wm, Wn' of the other second flow path grooves 101, 102. That is, the groove widths Wm, Wn', Wk' of the narrow portions 101a, 102a, 105a are set such that the groove width is wider at larger one of the angles θm, θn', θk between the directions Lm, Ln', Lk in which the second flow path grooves 101, 102, 105 as the branch destinations extend and the direction Lo in which the first flow path groove 100 as the branch source extends. Therefore, the flow rate of the oxidant gas flowing to the second flow path grooves 101, 102, 105 is adjusted to be uniform by the groove widths Wm, Wn', Wk' of the narrow portions 101a, 102a, 105a. In addition, the relationship between the groove widths Wm, Wn', Wk' and the angles θm, θn', and θk may be, for example, a proportional relationship or a discontinuous step-like increasing relationship, but is not limited thereto.

Therefore, by causing the flow rate of the oxidant gas flowing to the second flow path grooves 101, 102 to be uniform, the amount of power generated by the entire MEA 5 can be uniformly distributed. In addition, in a case where the configurations of this example and the fourth embodiment are applied to the branch portion 10b, the flow rate of the oxidant gas flowing from the second flow path grooves 101, 102, 105 as the branch destinations to the first flow path groove 100 as the branch source is caused to be uniform by the groove widths Wm, Wn', Wk' according to the angles θm, θn' θk. Therefore, the same effects as described above are obtained.

The configuration of each of the embodiments described above can also be applied to the flow path groove group 20 of the separator plate 2 on the anode side, and in this case, the same effects as described above are obtained. By applying the configuration of each of the embodiments described above to at least one of the separator plate 1 on the cathode side and the separator plate 2 on the anode side, the effects described above are obtained. In a case where the configuration is applied to both the separator plates 1, 2, the effects are increased.

As described above, with the separator plates 1, 2 of the embodiments or the fuel cell provided with the separator plates 1, 2, the production efficiency can be maintained while the deterioration in the MEA 5 is suppressed.

The embodiments described above are examples. However, the disclosure is not limited thereto, and various modifications can be made without departing from the gist of the disclosure.

What is claimed is:

1. A separator for a fuel cell, the separator comprising:
a separator plate provided with a flow path groove group through which a reaction gas for the fuel cell flows,
wherein the flow path groove group includes a single first flow path groove, a plurality of second flow path grooves, and at least two narrow portions are provided at an intersection where the single first flow path groove branches to an end portion of each of the plurality of second flow path grooves;
each of the at least two narrow portions is connected to the end portion of a corresponding one of the plurality of second flow path grooves and a groove depth of the at least two narrow portions is shallower than a groove depth of the first flow path and a groove depth of the corresponding one of the plurality of second flow path;
the groove width of the narrow portion increases toward the corresponding one of the second flow path grooves.

2. The separator according to claim 1, wherein
angles between a direction in which each of the plurality of the second flow path grooves extends and a direction in which the single first flow path groove extends are equal to each other; and
the groove widths of the at least two narrow portions are equal to each other.

3. The separator according to claim 1, wherein
each of the plurality of the second flow path grooves has an angle that is formed between a direction in which the second flow path groove extends and a direction in which the single first flow path groove extends, and
the groove width of one of the at least two narrow portions connected to the end portion of the second flow path groove having a larger angle is wider.

4. The separator according to claim 1, wherein the at least two narrow portions are connected to an entrance of the single first flow path groove.

5. The separator according to claim 1, wherein the flow path groove group includes a communication groove that provides communication between a third flow path groove adjacent to the single first flow path groove and the at least two narrow portions.

6. The separator according to claim 5, wherein a groove width of the communication groove is narrower than the groove width of the at least two narrow portions.

7. The separator according to claim 5, wherein a groove depth of the communication groove is shallower than the groove depth of the at least two narrow portions.

8. The separator according to claim 1, wherein the separator plate is a metal plate having a corrugated plate shape corresponding to the flow path groove group.

9. The separator according to claim 1, wherein at a point at which the end portion of the first flow path groove and the intersection are connected to each other, a bottom surface of the first flow path groove and a bottom surface of the intersection are connected to each other by an inclined surface.

10. The separator according to claim 1, wherein at a point at which the end portion of one of the plurality of the second flow path grooves and the intersection are connected to each other, a bottom surface of the one of the plurality of second flow path grooves and the bottom surface of the intersection are connected to each other by an inclined surface.

11. A fuel cell comprising:
a membrane electrode assembly that generates power using a reaction gas; and
a pair of separators between which the membrane electrode assembly is interposed, wherein at least one of the separators further comprises:
a separator plate provided with a flow path groove group through which the reaction gas for the fuel cell flows,
wherein the flow path groove group includes a single first flow path groove, a plurality of second flow path grooves, and at least two narrow portions are provided at an intersection where the single first flow path groove branches to an end portion of each of the plurality of second flow path grooves;
each of the at least two narrow portions is connected to the end portion of a corresponding one of the plurality of second flow path grooves and a groove depth of the at least two narrow portions is shallower than a groove depth of the first flow path and a groove depth of the corresponding one of the plurality of second flow path;
the groove width of the narrow portion increases toward the corresponding one of the second flow path grooves.

* * * * *